(12) United States Patent
Kinnunen et al.

(10) Patent No.: US 7,702,036 B2
(45) Date of Patent: Apr. 20, 2010

(54) DATA SEQUENCE DETECTION IN COMMUNICATION SYSTEM

(75) Inventors: Pasi Kinnunen, Oulu (FI); Kari Horneman, Oulu (FI)

(73) Assignee: Nokia Corporation, Espoo (FI)

( * ) Notice: Subject to any disclaimer, the term of this patent is extended or adjusted under 35 U.S.C. 154(b) by 784 days.

(21) Appl. No.: 11/204,112

(22) Filed: Aug. 16, 2005

(65) Prior Publication Data

US 2006/0285610 A1 Dec. 21, 2006

(30) Foreign Application Priority Data

Jun. 15, 2005 (FI) .................................. 20055311

(51) Int. Cl.
*H04L 27/00* (2006.01)
(52) U.S. Cl. .................. 375/316; 375/335; 375/340; 375/343; 375/140; 375/142; 375/148; 375/149; 375/259
(58) Field of Classification Search ............... 375/316, 375/367
See application file for complete search history.

(56) References Cited

U.S. PATENT DOCUMENTS 5,852,630 A * 12/1998 Langberg et al. ............ 375/219
6,813,323 B2 * 11/2004 Kajita et al. ................. 375/341
6,882,636 B1    4/2005 Kim et al.
2002/0191578 A1 * 12/2002 Bachl et al. ................. 370/342
2004/0125785 A1 *  7/2004 DiFazio et al. .............. 370/348
2005/0002477 A1 *  1/2005 Kajita et al. ................. 375/341
2005/0083901 A1 *  4/2005 Kim et al. .................... 370/342

FOREIGN PATENT DOCUMENTS

| WO | WO 02/069514  | 9/2002 |
| WO | WO 2004/012348 | 2/2004 |
| WO | WO 2005/027538 | 3/2005 |

* cited by examiner

*Primary Examiner*—Shuwang Liu
*Assistant Examiner*—Dhaval Patel
(74) *Attorney, Agent, or Firm*—Alston & Bird LLP (57) ABSTRACT

A solution for determining in a radio receiver a data sequence indicating transmission parameters of a frame before receiving the whole frame in the radio receiver in order to speed up processing of the data in the frame. According to the provided solution data is received in one or more time intervals, the data being part of a transmitted data sequence indicating transmission parameters of a frame. The possible data sequences are known to the radio receiver. The received data is compared with corresponding data of each known data sequence, and, on the basis of the comparison, the data sequence which is determined to be closest to the received data is selected. The transmission parameters of the frame are determined based on the selection.

17 Claims, 4 Drawing Sheets

DATA SEQUENCE DETECTION IN COMMUNICATION SYSTEM

FIELD

The invention relates to early detection of a data sequence indicating transmission parameters of a frame.

BACKGROUND

Figure 1A:
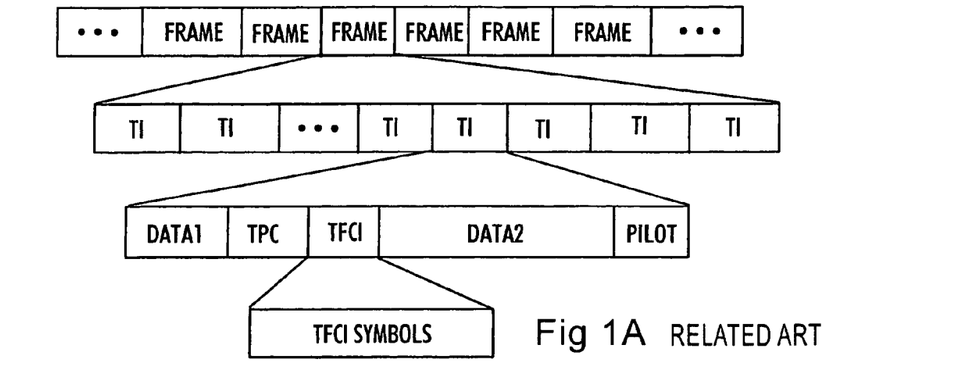
FIG. 1A illustrates a downlink frame structure of the UMTS described above.
Figure 1B:
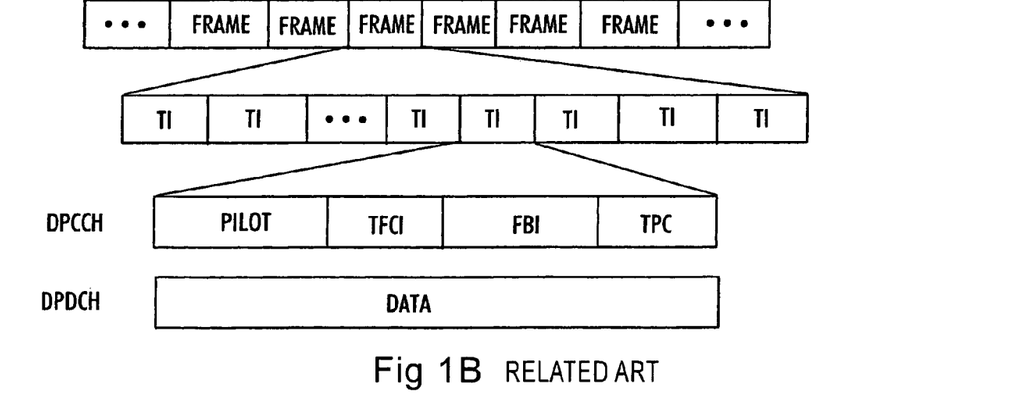
FIG. 1B illustrates an uplink frame structure of UMTS described above.

A modern communication system transfers information between a subscriber unit and a serving base station in a frame-structured format with a determined frame structure and frame parameters. The frame usually comprises information indicating the structure and parameters related to the frame. For example, FIGS. 1A and 1B illustrate downlink and uplink frame structures of Universal Mobile Communications System (UMTS) according to the $3^{rd}$ Generation Partnership Project (3GPP) specifications, respectively. Each frame comprises a plurality of time intervals (or time slots), specifically 15 time intervals (TI). Each time interval in the downlink frame in FIG. 1A comprises portions of data (DATA1 and DATA2), a portion of transmit power control symbols (TPC), a portion of transport format combination indicator symbols (TFCI), and a portion of pilot symbols which may be used, for example, in channel synchronisation. The uplink frame in FIG. 1B comprises data in data channel and TPC, TFCI, and pilot symbols. Additionally the uplink frame comprises feedback information (FBI) symbols. The TFCI symbols are used for informing a receiver of the transmission parameters of the frame. The TFCI symbols may comprise information on how to decode, de-multiplex and deliver the received data on the appropriate transport channels. In UMTS, each TFCI word comprises 10 bits, and the TFCI bits are encoded by using a (32, 10) sub-code of the second order Reed-Muller code in a transmitter. Thus, the result of the encoding process is 32 encoded TFCI bits. In each time interval of a frame, two encoded TFCI bits are transmitted to a receiver. Since there are only 15 time intervals in the frame the last two TFCI bits may be set to zero and, thus, the receiver also knows that the last two bits, which were not transmitted, are zero. Prior to the transmission, the TFCI bits may be mapped and modulated into TFCI symbols according to a symbol constellation used in the transmission.

Since the TFCI symbols are transmitted in several time intervals of the frame, the receiver has to wait for reception of the whole frame, and buffer the whole frame, before it can decode and determine the TFCI and start processing the received data. As a consequence, the receiver has to be provided with large buffers, which results in high costs and complexity of the receiver.

BRIEF DESCRIPTION OF THE INVENTION

An object of the invention is to provide an improved solution for determining in a radio receiver a data sequence indicating transmission parameters of a frame, the data sequence being a data sequence of a data sequence set known to the radio receiver and the frame comprising a plurality of time intervals.

According to an aspect of the invention, there is provided a method for determining in a radio receiver a data sequence indicating transmission parameters of a frame, the data sequence being a data sequence of a data sequence set known to the radio receiver and the frame comprising a plurality of time intervals. The method comprises receiving data in one or more time intervals, the data being part of a transmitted data sequence indicating transmission parameters of a frame. The method further comprises comparing the received data with corresponding data of each known data sequence of the known data sequence set, selecting, on the basis of the comparison, the data sequence of the known data sequence set which is determined to be closest to the received data, and determining the transmission parameters of the frame on the basis of the selection.

According to another aspect of the invention, there is provided a radio receiver for determining a data sequence indicating transmission parameters of a frame, the data sequence being a data sequence of a data sequence set known to the radio receiver and the frame comprising a plurality of time intervals. The radio receiver comprises a communication interface for reception of data and a control unit. The control unit is configured to receive, through the communication interface, data in one or more time intervals, the data being part of a transmitted data sequence indicating transmission parameters of a frame. The control unit is further configured to compare the received data with corresponding data of each known data sequence of the known data sequence set, select, on the basis of the comparison, the data sequence of the known data sequence set which is determined to be closest to the received data, and determine the transmission parameters of the frame on the basis of the selection.

According to another aspect of the invention, there is provided a computer program product encoding a computer program of instructions for executing a computer process for determining in a radio receiver a data sequence indicating transmission parameters of a frame, the data sequence being a data sequence of a data sequence set known to the radio receiver and the frame comprising a plurality of time intervals. The process comprises receiving data in one or more time intervals, the data being part of a transmitted data sequence indicating transmission parameters of a frame. The process further comprises comparing the received data with corresponding data of each known data sequence of the known data sequence set, selecting, on the basis of the comparison, the data sequence of the known data sequence set which is determined to be closest to the received data, and determining the transmission parameters of the frame on the basis of the selection.

According to another aspect of the invention, there is provided a computer program distribution medium readable by a computer and encoding a computer program of instructions for executing a computer process for determining in a radio receiver a data sequence indicating transmission parameters of a frame, the data sequence being a data sequence of a data sequence set known to the radio receiver and the frame comprising a plurality of time intervals. The process comprises receiving data in one or more time intervals, the data being part of a transmitted data sequence indicating transmission parameters of a frame. The process further comprises comparing the received data with corresponding data of each known data sequence of the known data sequence set, selecting, on the basis of the comparison, the data sequence of the known data sequence set which is determined to be closest to the received data, and determining the transmission parameters of the frame on the basis of the selection.

The invention provides several advantages. The invention provides a solution for an early detection of transmission parameters of a frame, which speeds up processing of the received data. As a consequence, processing of the received data may be started before the whole frame has been received.

This reduces the size of the receiver buffers required in the receiver, which reduces cost and complexity of the receiver.

LIST OF DRAWINGS

In the following, the invention will be described in greater detail with reference to the embodiments and the accompanying drawings, in which.

DESCRIPTION OF EMBODIMENTS

Figure 2:
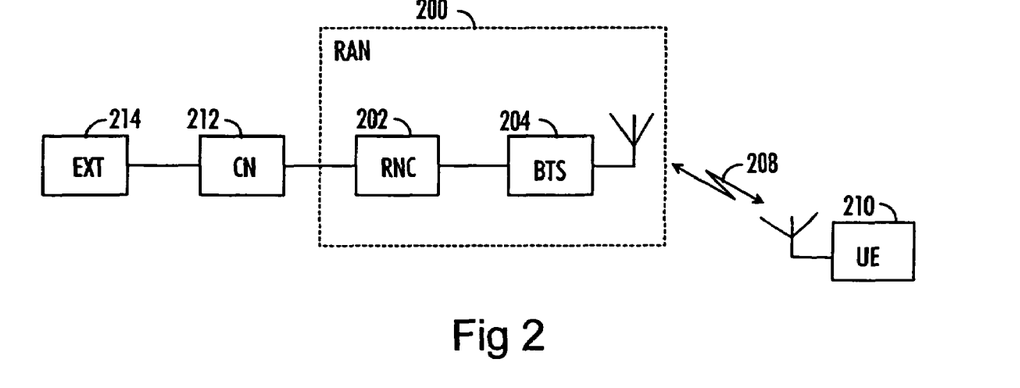
FIG. 2 illustrates a structure of a communication system in which embodiments of the invention may be implemented.

With reference to FIG. 2, examine an example of a data transmission system in which embodiments of the invention can be applied. The structure and the elements of the system illustrated in FIG. 2 are the same as in the Universal Mobile Telecommunication System (UMTS) network, but it should, however, be noted that implementation of the proposed data detection method is not limited to the UMTS system, but it may also be implemented in other suitable communication systems which employ frame-structured data transfer with each frame comprising a plurality of time intervals (or time slots), and the information comprising transmitted transmission parameters being distributed over several time intervals.

The network elements of the communication system of FIG. 2 can be grouped into the radio access network (RAN) 200 that handles all radio-related functionalities of the system, and a core network (CN) 212, which takes care of switching and routing calls and data connections to external networks 214. External network may be for example the Internet, Integrated Services Digital Network (ISDN), or Public Switched Telephone Network (PSTN).

The radio access network 200 comprises one or more base transceiver stations (BTS) 204, or node Bs, which is the equivalent term in the 3GPP specifications, and radio network controllers (RNC) 202. A BTS 204 is responsible for providing an air interface radio connection 208 to the subscriber units 210 within its coverage area also known as a cell. The BTS 204 also performs physical level signal processing like modulation, channel coding, etc. The BTS 204 may also perform some basic radio resource management operations like operations related to power control.

A radio network controller 202 is the network element which is responsible for the control of radio resources in the RAN 200. The RNC 202 serves as a switching and controlling element of the RAN 200 and typically controls several BTSs 204, but it may also control only a single BTS 204. RNC 202 is responsible for controlling load and congestion of traffic channels of its own cells. The RNC 202 also takes care of procedures related to admission control, handovers, and power control. The radio network controller 202 typically includes a digital signal processor and software for executing computer processes stored on a computer readable medium. Furthermore, the radio network controller 202 typically includes connecting means for communicating electric signals with other network elements, such as other radio network controllers and/or base transceiver stations, but also with the core network 212.

The core network 212 provides a combination of switching and transmission equipment, which together form a basis for telecommunication network services. The core network also performs procedures related to radio resource management. The core network 212 may provide circuit-switched and/or packet-switched data transport services to the user entities.

Figure 3:
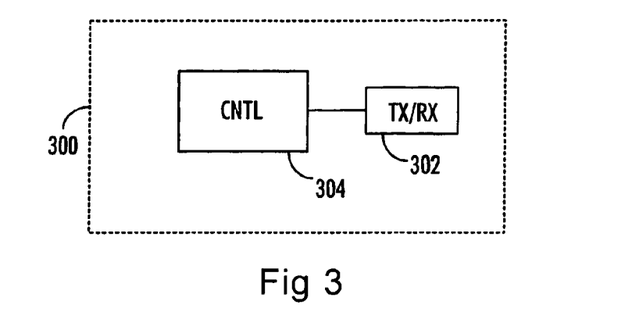
FIG. 3 illustrates a structure of a radio receiver in which embodiments of the invention may be implemented.

Next, structure of a radio receiver 300 will be described with reference to FIG. 3. The radio receiver 300 may be a subscriber unit of a communication system such as a mobile communication device, or a computer with a communication interface to provide a radio connection. The radio receiver may also be a network element of a communication system, such as a base transceiver station or an access point to a communication network.

The radio receiver 300 comprises a communication interface 302 to receive, in conjunction with an antenna, information signals transmitted over a radio connection. If the radio receiver 300 is a subscriber unit, the communication interface 302 may provide a connection with a communication network 302 through a serving base transceiver station or an access point. The communication interface 302 may also provide capability to transmit information signals over a radio interface.

The radio receiver 300 further comprises a control unit 304 to control functions of the radio receiver 300. The control unit 304 may comprise means for retrieving information from a received signal. The retrieval procedure may comprise determining transmission parameters of a frame in reception and processing the frame in reception according to the determined transmission parameters. The control unit 304 may be implemented with a digital signal processor with suitable software embedded in a computer readable medium, or with separate logic circuits, for example with ASIC (Application Specific Integrated Circuit).

Next, determination of a data sequence describing transmission parameters of a frame according to an embodiment of the invention will be described with reference to the downlink in the UMTS. It should, however, be appreciated that the invention is limited neither to the downlink direction nor to the UMTS and may be implemented in the uplink direction and in other communication systems as well.

During the establishment of a connection between a subscriber unit and a radio network, a higher-level protocol may select a set of possible transport format combinations with each transport format combination being represented by a transport format combination indicator (TFCI) described in the Background section. This set may be referred to as a transport format combination set (TFCS). The TFCS may be transmitted to both the base station and the subscriber unit. Transmission parameters of frames used in communication between a subscriber unit and a base station may be selected by a medium access control (MAC) protocol located in a radio network controller. The transmission parameters are selected by selecting a TFCI associated with the desired transmission parameter from the TFCS. As mentioned above, the TFCI is a data sequence indicating the transmission parameters of a frame.

When communication between the base station and the subscriber unit is active, the base station receives data from the radio network controller to be transmitted to the subscriber unit. The base station processes the data according to parameters indicated by the TFCI currently in use. The TFCI indicates, among other things, how to map transport channels used in communication between the base station and the radio network controller into dedicated channels used in communication with the base station and the subscriber unit and how to encode the data to be transmitted. After processing the data, the base station transmits the data to the subscriber unit in a frame-structured format.

The whole frame may be processed according to one TFCI and the TFCI corresponding to the frame is also transmitted to the subscriber unit such that the TFCI is distributed over the plurality of time intervals of the frame. Each time interval may comprise part of the TFCI sequence. The TFCI bits may be encoded in the transmitter (the base station in this example) using a determined coding scheme. The encoded TFCI bits may also be mapped and modulated into symbols according to a symbol constellation used in the transmission.

As mentioned above, the TFCS is also known to the receiver (subscriber unit in this example), and this information may be used in detection of the correct TFCI of a frame. When the receiver has received a determined amount of TFCI symbols, given by desired reliability of the detection, it may initiate a procedure for determining the transmitted TFCI. The desired reliability may be selected from a preset table.

For the detection of the TFCI of the frame, the receiver may first encode each TFCI sequence of the known TFCS using the same coding scheme as was used for the TFCI sequence of the frame in the transmitter. These encoded TFCI code words of the TFCS may be stored in the receiver such that there is no need to encode them at the reception of every frame.

At the reception of each time interval of the frame, the receiver may pick the TFCI symbols from the data of the time interval and demodulate, detect, and remove mapping of the TFCI symbols in order to obtain detected TFCI bits which are still in the encoded format. The demodulation, the detection, and the removal of mapping may be carried out by using a procedure known in the art.

When a determined amount of detected TFCI bits have been obtained, the detected TFCI bits are compared with the corresponding TFCI bits of each encoded TFCI code word of the TFCS in the receiver. For example, if the first eight TFCI bits have been detected, these bits are compared with the first eight bits of each encoded TFCI code word of the TFCS. The comparison may be carried out using, for example, the following equation:

$$dist(i) = \frac{1}{N_{TFCI}} \sum_{n=1}^{N_{TFCI}} |TFCI_{cw,i}(n) - TFCI_{rx}(n)|, \quad (1)$$

where dist(i) is the distance between the received detected TFCI bits and the TFCI bits of a TFCI code word of the TFCS, i is an index discriminating each TFCI of the TFCS (i runs from one to the number of TFCIs in the TFCS), $N_{TFCI}$ is the number TFCI bits included in the comparison, $TFCI_{cw,i}(n)$ corresponds to the $n^{th}$ TFCI bit of the $i^{th}$ TFCI code word of the TCFS, and $TFCI_{rx}(n)$ corresponds to the $n^{th}$ TFCI bit of the received and detected part of the transmitted TFCI code word. As can be seen, equation (1) measures distance (or difference) between the received detected TFCI bits and the corresponding TFCI bits of each TFCI code word of the TFCS. Thus, after comparing each TFCI code word with the received detected TFCI bits, the TFCI code word with the lowest distance [dist(i)] to the received detected TFCI bits is selected, and transmission parameters of the frame are determined on the basis of that selection. Now, that the transmission parameters of the frame have been determined, the receiver may start processing the data of the received time intervals by decoding, demultiplexing and delivering the received data on the appropriate transport channels before the whole frame has been received. When reception of a new frame is started, a new comparison between the newly received TFCI bits (which have been demodulated and detected) and the corresponding TFCI bits of each TFCI code word of the TFCS may be carried out.

Equation (1) may also be used, if each TFCI of the TFCS was not encoded in the receiver. In this case, the received detected TFCI bits may be decoded before the computation of the equation (1).

When comparing the received detected TFCI bits with each TFCI code word of the TFCS by using equation (1), two (or more) TFCI code words may have an equal distance dist(i) to the received TFCI bits. In this case, it may be determined that additional received TFCI bits has to be included in the comparison. Therefore, the receiver may wait for reception, demodulation and detection of additional TFCI bit or bits and recalculate distances with the additional TFCI bits. The distances may be calculated for those TFCI code words which were of equal distance to the received TFCI bits in order to reduce computational load, or the distances may be calculated for each TFCI code word of the TFCS. After the recalculation, the TFCI code word with the lowest distance [dist(i)] to the received detected TFCI bits is selected, and transmission parameters of the frame are determined on the basis of that selection.

According to another embodiment of the invention, detection of the transmitted TFCI code word may be carried out without a need to remove mapping of the received detected TFCI symbols. According to this embodiment, each known TFCI code word of the TFCS may be encoded by using a determined coding scheme and mapped into mapped TFCI bits in the receiver according to the symbol constellation used in the transmission of the TFCI bits in the transmitter, yielding mapped TFCI bits for each TFCI code word of the TFCS.

Again, at the reception of each time interval of the frame, the receiver may pick the TFCI symbols from the data of the time interval, demodulate and detect them. When a determined amount of detected TFCI symbols have been obtained, the received detected TFCI symbols may be compared with the mapped TFCI bits of the TFCS by using the following equation:

$$dist2(i) = \frac{1}{N_{TFCIS}} \sum_{n=1}^{N_{TFCIS}} TFCI_{cws,i}(n) TFCI_{rxs}^*(n), \quad (2)$$

where dist2(i) is the result of the comparison between the received detected TFCI symbols and mapped TFCI bits of a TFCI code word of the TFCS, i is an index discriminating each TFCI code word of the TFCS (i runs from one to the number of TFCI code words in the TFCS), $N_{TFCIS}$ is the number of mapped TFCI bits included in the calculation of the equation (2), $TFCI_{cws,i}(n)$ is the $n^{th}$ mapped bit of the $i^{th}$ TFCI code word of the TFCS, $TFCI_{rxs}(n)$ is the $n^{th}$ received detected TFCI symbol and * denotes complex conjugate operation. As can be seen, equation (2) multiplies the complex conjugates of the received detected TFCI symbols with the corresponding mapped bits of the $i^{th}$ TFCI code word and calculates an average value from these multiplications. Therefore, the TFCI code word which results in highest dist2

(*i*) is selected as the most likely transmitted TFCI code word, and the transmission parameters of the frame are determined on the basis of that selection. Now, that the transmission parameters of the frame have been determined, the receiver may start processing the data of the received time intervals by decoding, demultiplexing and delivering the received data on the appropriate transport channels before the whole frame has been received.

In the above description, downlink case has been described. Naturally, the determination of transmission parameters of a frame according to the embodiments of the invention may be carried out in uplink case, too. In the uplink case, a base transceiver station, for example, may be the radio receiver performing the determination of the transmission parameters.

Figure 4:
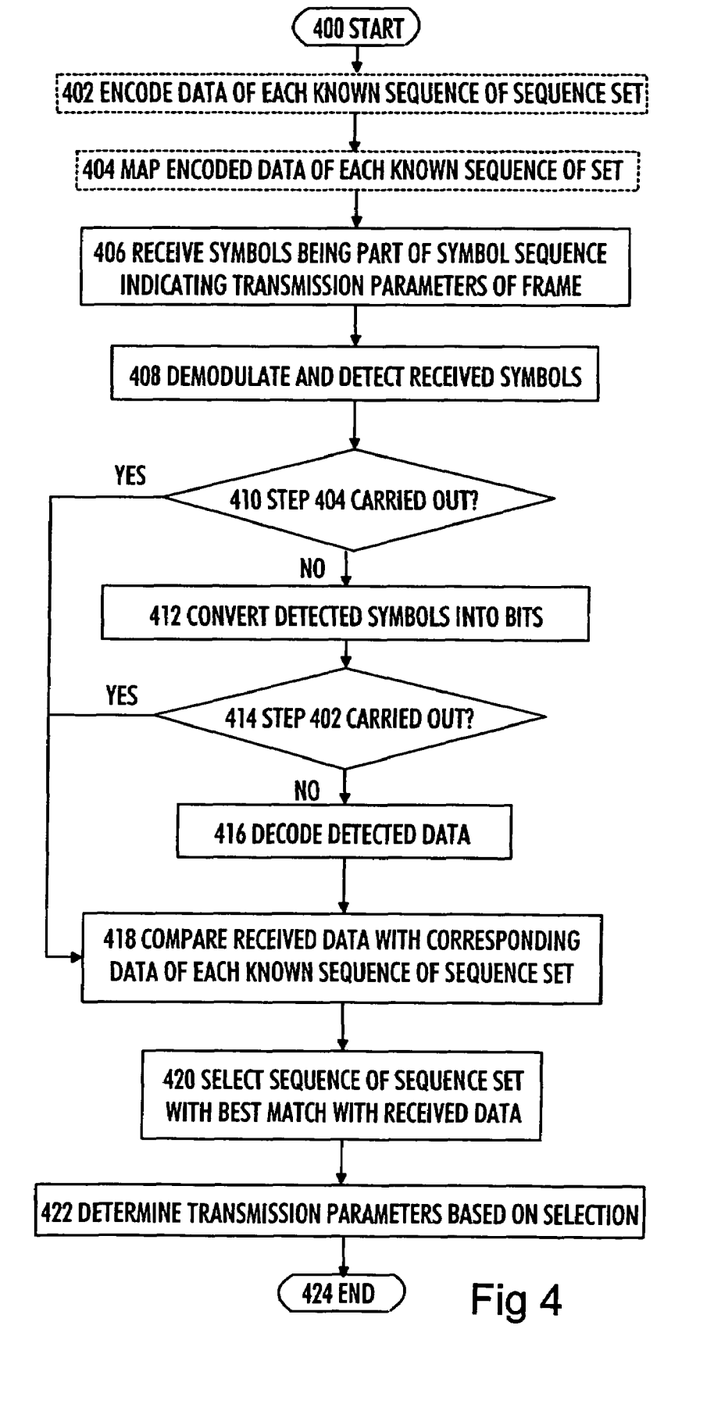
FIG. 4 is a flow diagram of a method of detecting a data sequence indicating transmission parameters of a frame according to an embodiment of the invention.

Next, a process for determining transmission parameters of a frame in reception in a radio receiver according to an embodiment of the invention will be described with reference to the flow diagram of FIG. 4. The frame comprises a plurality of time intervals and the transmission parameters are determined from a data sequence indicating the transmission parameters of the frame. The data sequence indicating the transmission parameters of the frame may be a TFCI of the UMTS and may be distributed over the plurality of time intervals in the frame. The data sequence is part of a data sequence set known by the radio receiver. The received data sequence from which the transmission parameters are determined may be a sequence of detected data bits or mapped data bits, for example. The process starts in step 400.

Steps 402 and 404 are optional and may be carried out if so determined. Performing step 404 depends, however, on whether or not step 402 has been carried out. Step 404 may be performed, if step 402 has been carried out. In step 402, each data sequence of the data sequence set known by the radio receiver are encoded by using the same coding scheme used for encoding the data sequence indicating the transmission parameters of the frame in a transmitter. In step 404, each encoded data sequence of the data sequence set known by the radio receiver are mapped into a mapped data sequence by using the same symbol constellation as used for the encoded data sequence indicating the transmission parameters of the frame in the transmitter.

In step 406, data symbols being part of the symbol sequence indicating the transmission parameters of the frame are received in the radio receiver. In step 408, the received data symbols are demodulated and data detection is carried out on them, thus yielding detected mapped data bits. In step 410, it is checked whether step 404 was carried out, i.e. whether each encoded data sequence of the known data sequence set was mapped into a mapped data sequence. If step 404 was not processed, the process moves to step 412 where the mapping of the received detected data symbols is removed in order to convert the received data symbols into received data bits. If step 404 was processed, the process moves to step 418 which will be explained below. From step 412, the process moves to step 414 where it is checked, whether step 402 was processed. If step 402 was not processed, the process moves to step 416 where the received detected data is decoded. If step 402 was processed, the process moves to step 418 where the received data is compared with the corresponding data of each sequence of the sequence set known by the receiver. If the received data has been processed into data bits, i.e. the process moves from either step 414 or step 416 to step 418, the comparison may be carried out according to equation (1). If the received data is in a mapped form, i.e. the process moves from step 410 to step 418, the comparison may be carried out according to equation (2).

From step 418 the process moves to step 420 where the data sequence of the data sequence set which provides the best match with the received data is selected as the most likely transmitted data sequence indicating transmission parameters of the frame. In step 422, based on that selection, transmission parameters of the frame are determined. The process ends in step 424.

Figure 5:
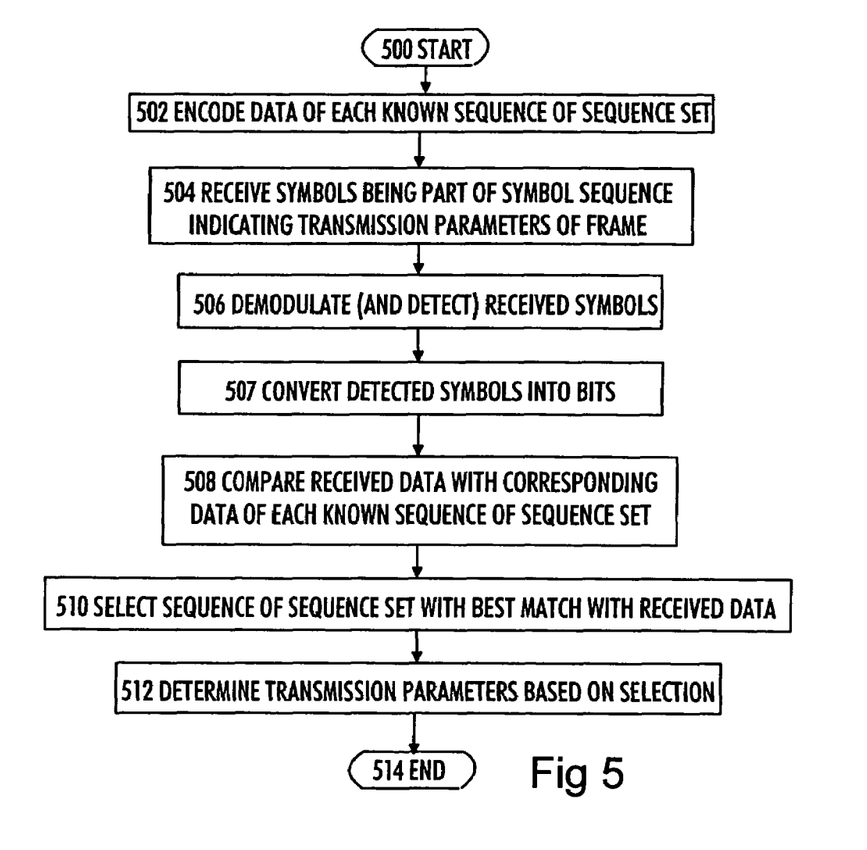
FIG. 5 is a flow diagram of a method of detecting a data sequence indicating transmission parameters of a frame according to an embodiment of the invention.

If the radio receiver employs only encoding of each data sequence of the data sequence set known by the radio receiver (step 402 in FIG. 4), and does not employ modulation of each data sequence (step 404 in FIG. 4) under any circumstances, a process for determining transmission parameters of a frame in reception in a radio receiver may be carried out as illustrated in the flow diagram of FIG. 5. Steps 500, 502, 504, 506, 507 508, 510, 512, and 514 correspond to steps 400, 402, 406, 408 412, 418, 420, 422, and 424 of FIG. 4, respectively. Here, the radio receiver compares the received detected data indicating transmission parameters of a frame with the corresponding encoded data of each data sequence of the data sequence set. The comparison may be carried out, for example, by using equation (1). In this case the comparison is carried out by comparing data bits.

Figure 6:
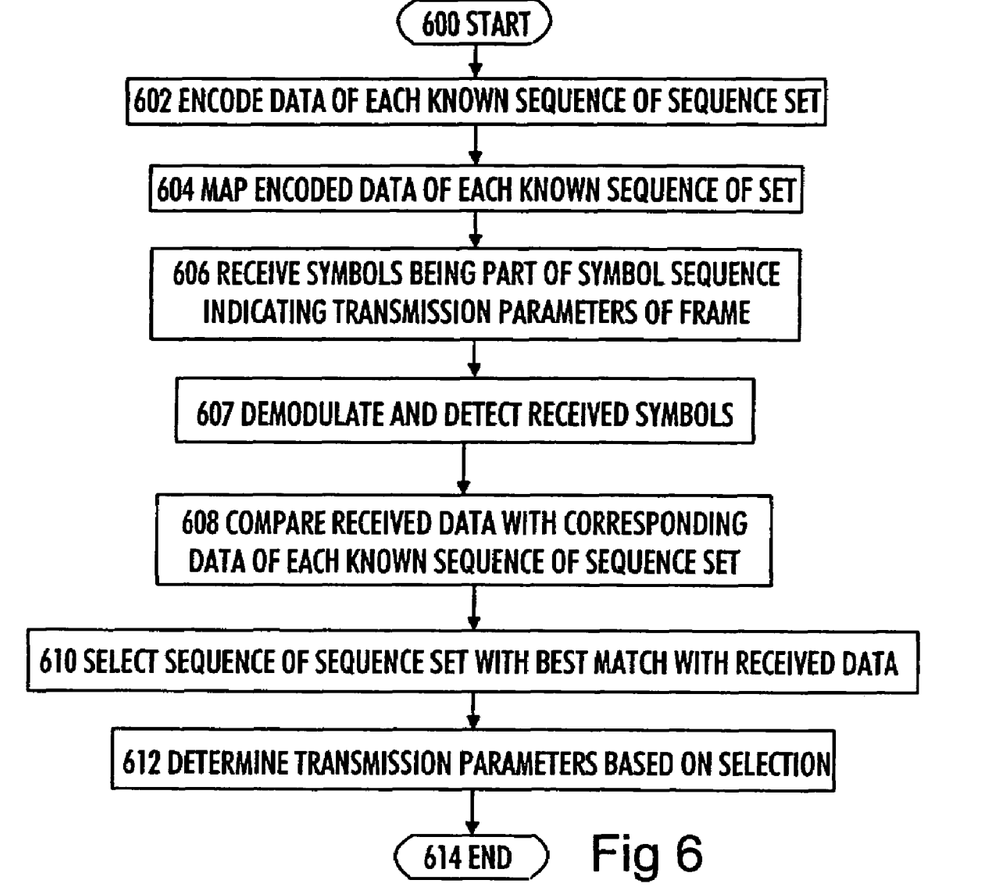
FIG. 6 is a flow diagram of a method of detecting a data sequence indicating transmission parameters of a frame according to an embodiment of the invention.

If the radio receiver employs both encoding of each data sequence of the data sequence set known by the radio receiver (step 402 in FIG. 4), and mapping of each encoded data sequence (step 404 in FIG. 4), i.e. does not support the procedure of only encoding of each data sequence of the data sequence set without mapping of each encoded data sequence, a process for determining transmission parameters of a frame in reception in a radio receiver may be carried out as illustrated in the flow diagram of FIG. 6. Steps 600, 602, 604, 606, 607, 608, 610, 612, and 614 correspond to steps 400, 402, 404, 406, 408, 418, 420, 422, and 424 of FIG. 4, respectively. Here, the radio receiver compares the received detected data symbols indicating transmission parameters of a frame with the corresponding encoded and mapped data bits of each data sequence of the data sequence set. The comparison may be carried out, for example, by using equation (2). In this case the comparison is carried out by comparing mapped data bits.

The embodiments of the invention may be realized in an electronic device, comprising a communication interface and a control unit operationally connected to the communication interface. The control unit may be configured to perform at least some of the steps described in connection with at least one of the flowcharts of FIGS. 4, 5, and 6. The embodiments may be implemented as a computer program comprising instructions for executing a computer process for detecting in a radio receiver a symbol sequence indicating transmission parameters of a frame, the symbol sequence being a symbol sequence of a symbol sequence set known by the radio receiver and the frame comprising a plurality of time intervals.

The computer program may be stored on a computer program distribution medium readable by a computer or a processor. The computer program medium may be, for example but not limited to, an electric, magnetic, optical, infrared or semiconductor system, device or transmission medium. The medium may be a computer readable medium, a program storage medium, a record medium, a computer readable memory, a random access memory, an erasable programmable read-only memory, a computer readable software distribution package, a computer readable signal, a computer readable telecommunications signal, and/or a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:

encoding each bit sequence of a known bit sequence set with a code;

receiving, at a controller, data in one or more time intervals, the data comprising part of a transmitted bit sequence indicating transmission parameters of a frame, wherein the transmitted bit sequence comprises a bit sequence of the known bit sequence set that is also encoded with the code and the frame comprises a plurality of time intervals;

comparing, by the controller before all symbols of the bit sequence indicating the transmission parameters of the frame have been received and detected, the received encoded bits with corresponding bits of each known bit sequence of the known bit sequence set;

selecting, by the controller based on the comparison, the bit sequence of the known bit sequence set which is determined to be closest to the received data; and determining, by the controller, the transmission parameters of the frame based on the selection;

wherein the comparing comprises comparing based on calculation of a difference between the received encoded bits with the corresponding bits of each known encoded bit sequence of the known bit sequence set, wherein the calculation is based on the following equation:

$$dist(i) = \frac{1}{N_{TFCI}} \sum_{n=1}^{N_{TFCI}} |TFCI_{cw,i}(n) - TFCI_{rx}(n)|,$$

where:

dist(i) is the difference between the received encoded bits and the corresponding bits of an $i^{th}$ known encoded bit sequence of the known bit sequence set, $N_{TFCI}$ is the number of received encoded bits included in the comparison, $TFCI_{cw,i}(n)$ corresponds to an $n^{th}$ bit of the $i^{th}$ known encoded bit sequence of the known bit sequence set, and $TFCI_{rx}(n)$ corresponds to the $n^{th}$ bit of the received encoded bits of the encoded bit sequence indicating the transmission parameters of the frame.

2. The method of claim 1, further comprising:

mapping each encoded bit sequence of the known bit sequence set into mapped bits by using a same symbol constellation used for mapping the bit sequence indicating the transmission parameters of the frame in a transmitter, to obtain mapped bits of each encoded bit sequence of the known bit sequence set;

receiving symbols in the one or more time intervals, the symbols comprising part of a transmitted symbol sequence comprising an indication of the transmission parameters of the frame;

detecting the received symbols; and comparing the received detected symbols with the corresponding mapped bits of each encoded bit sequence of the known bit sequence set.

3. The method of claim 2, wherein the comparing comprises comparing based on the following equation:

$$dist2(i) = \frac{1}{N_{TFCIS}} \sum_{n=1}^{N_{TFCIS}} TFCI_{cws,i}(n) TFCI_{rxs}^{*}(n)$$

where:

dist2(i) is a result of the comparison between the received detected symbols and the corresponding mapped bits of an $i^{th}$ encoded bit sequence of the known bit sequence set;

$N_{TFCIS}$ is a number of received detected symbols included in the calculation of the above equation;

$TFCI_{cws,i}(n)$ is an $n^{th}$ mapped bit of the $i^{th}$ encoded bit sequence of the known bit sequence set;

$TFCI_{rxs}(n)$ is an $n^{th}$ received detected symbol; and

* denotes a complex conjugate operation.

4. The method of claim 1, further comprising:

initiating the comparison upon reception of a determined amount of data of the bit sequence indicating the transmission parameters of the frame.

5. The method of claim 4, further comprising:

indicating the transmission parameters of the frame being based on a desired reliability of the detection using the determined amount of data of the bit sequence.

6. The method of claim 1, further comprising:

determining, after comparison, whether additional data indicating the transmission parameters of the frame is to be included in the comparison before selecting the bit sequence of the known bit sequence set closest to the received data;

receiving the additional data indicating the transmission parameters of the frame, when determining that the additional data indicating the transmission parameters of the frame is to be included in the comparison; and comparing the received data, including the additional data, with each known bit sequence of the known bit sequence set.

7. The method of claim 1, further comprising:

determining the transmission parameters of the frame being distributed over the time intervals of the frame using an indication of the bit sequence.

8. The method of claim 1, further comprising:

determining transmission parameters of the frame before reception of the frame is complete.

9. An apparatus, comprising at least one processor and at least one memory storing computer program code, wherein the at least one memory and stored computer program code are configured to, with the at least one processor, cause the apparatus to at least:

encode each bit sequence of a known bit sequence set with a code;

cause receipt of data in one or more time intervals, the data comprising part of a transmitted bit sequence indicating transmission parameters of a frame, wherein the transmitted bit sequence comprises a bit sequence of the known bit sequence set that is also encoded with the code and the frame comprises a plurality of time intervals;

compare, before all symbols of the bit sequence indicating the transmission parameters of the frame have been received and detected, the received encoded bits with corresponding bits of each known data sequence of the known bit sequence set;

select, based on the comparison, the bit sequence of the known bit sequence set which is determined to be closest to the received data; and determine the transmission parameters of the frame based on the selection;

wherein the at least one memory and stored computer program code are configured to, with the at least one processor, cause the apparatus to compare the received encoded bit with the corresponding bits of each known data sequence of the known bit sequence set based on calculation of a difference between the received encoded bits with the corresponding bits of each known encoded bit sequence of the known bit sequence set, wherein the calculation is based on the following equation:

$$dist(i) = \frac{1}{N_{TFCI}} \sum_{n=1}^{N_{TFCI}} |TFCI_{cw,i}(n) - TFCI_{rx}(n)|,$$

where:

dist(i) is the difference between the received encoded bits and the corresponding bits of an $i^{th}$ known encoded bit sequence of the known bit sequence set, $N_{TFCI}$ is the number of received encoded bits included in the comparison, $TFCI_{cw,i}(n)$ corresponds to an $n^{th}$ bit of the $i^{th}$ known encoded bit sequence of the known bit sequence set, and $TFCI_{rx}(n)$ corresponds to the $n^{th}$ bit of the received encoded bits of the encoded bit sequence indicating the transmission parameters of the frame.

10. The apparatus of claim 9, wherein the data sequence comprises a bit sequence, the known data sequence set comprises a known bit sequence set, and wherein the at least one memory and stored computer program code are configured to, with the at least one processor, further cause the apparatus to:

map each encoded bit sequence of the known bit sequence set by using a same symbol constellation used for mapping the bit sequence indicating the transmission parameters of the frame in a transmitter, to obtain mapped bits of each encoded bit sequence of the known bit sequence set, cause receipt of symbols in one or more time intervals, the symbols comprising part of a transmitted symbol sequence comprising an indication of the transmission parameters of the frame, detect the received symbols, and compare the received detected symbols with the corresponding mapped bits of each encoded bit sequence of the known bit sequence set.

11. The apparatus of claim 10, wherein the at least one memory and stored computer program code are configured to, with the at least one processor, cause the apparatus to compare by calculating the following equation:

$$dist2(i) = \frac{1}{N_{TFCIS}} \sum_{n=1}^{N_{TFCIS}} TFCI_{cws,i}(n)TFCI_{rxs}^*(n)$$

where:

dist2(i) is a result of the comparison between the received detected symbols and the corresponding mapped bits of an $i^{th}$ encoded bit sequence of the known bit sequence set;

$N_{TFCIS}$ is a number of received detected symbols included in the calculation of the above equation;

$TFCI_{cws,i}(n)$ is an $n^{th}$ mapped bit of the $i^{th}$ encoded bit sequence of the known bit sequence set;

$TFCI_{rxs}(n)$ is an $n^{th}$ received detected symbol; and

* denotes a complex conjugate operation.

12. The apparatus of claim 9, wherein the at least one memory and stored computer program code are configured to, with the at least one processor, further cause the apparatus to initiate the comparison upon reception of a determined amount of data of the bit sequence indicating the transmission parameters of the frame.

13. The apparatus of claim 9, wherein the at least one memory and stored computer program code are configured to, with the at least one processor, further cause the apparatus to:

determine, after comparison, whether additional data indicating the transmission parameters of the frame is to be included in the comparison before selecting the bit sequence of the known bit sequence set closest to the received data, cause receipt of the additional data indicating the transmission parameters of the frame, when determining that the additional data indicating the transmission parameters of the frame is to be included in the comparison, and compare the received data, including the additional data, with each known bit sequence of the known bit sequence set.

14. The apparatus of claim 9, wherein the bit sequence indicating the transmission parameters of the frame is distributed over the time intervals of the frame.

15. The apparatus of claim 9, wherein the at least one memory and stored computer program code are configured to, with the at least one processor, further cause the apparatus to determine the transmission parameters of the frame before reception of the frame is complete.

16. An apparatus, comprising:

means for encoding each bit sequence of a known bit sequence set with a code;

means for receiving data in one or more time intervals, the data comprising part of a transmitted bit sequence indicating transmission parameters of a frame, wherein the bit sequence comprises a bit sequence of the known bit sequence set that is encoded with the code and the frame comprises a plurality of time intervals;

means for comparing, before all symbols of the bit sequence indicating the transmission parameters of the frame have been received and detected, the received encoded bits with corresponding bits of each known bit sequence of the known bit sequence set;

means for selecting, based on the comparison, the bit sequence of the known bit sequence set which is determined to be closest to the received data; and means for determining the transmission parameters of the frame based on the selection;

wherein the means for comparing comprises means for comparing based on calculation of a difference between the received encoded bits with the corresponding bits of each known encoded bit sequence of the known bit sequence set, wherein the calculation is based on the following equation:

$$dist(i) = \frac{1}{N_{TFCI}} \sum_{n=1}^{N_{TFCI}} |TFCI_{cw,i}(n) - TFCI_{rx}(n)|,$$

where:
dist(i) is the difference between the received encoded bits and the corresponding bits of an $i^{th}$ known encoded bit sequence of the known bit sequence set, $N_{TFCI}$ is the number of received encoded bits included in the comparison, $TFCI_{cw,i}(n)$ corresponds to an $n^{th}$ bit of the $i^{th}$ known encoded bit sequence of the known bit sequence set, and $TFCI_{rx}(n)$ corresponds to the $n^{th}$ bit of the received encoded bits of the encoded bit sequence indicating the transmission parameters of the frame.

17. A computer program embodied in a non-transitory computer readable storage medium encoding a computer program of instructions for executing a computer process, the process comprising:

encoding each bit sequence of a known bit sequence set with a code;

receiving data in one or more time intervals, the data comprising part of a transmitted bit sequence indicating transmission parameters of a frame, wherein the bit sequence comprises a bit sequence of the known bit sequence set that is also encoded with code and the frame comprises a plurality of time intervals;

comparing, before all symbols of the bit sequence indicating the transmission parameters of the frame have been received and detected, the received encoded bits with corresponding bits of each known bit sequence of the known bit sequence set;

selecting, based on the comparison, the bit sequence of the known bit sequence set which is determined to be closest to the received data; and determining the transmission parameters of the frame based on the selection;

wherein comparing comprises comparing based on calculation of a difference between the received encoded bits with the corresponding bits of each known encoded bit sequence of the known bit sequence set, wherein the calculation is based on the following equation:

$$dist(i) \frac{1}{N_{TFCI}} \sum_{n=1}^{N_{TFCI}} |TFCI_{cw,i}(n) - TFCI_{rx}(n)|,$$

where:
dist(i) is the difference between the received encoded bits and the corresponding bits of an $i^{th}$ known encoded bit sequence of the known bit sequence set, $N_{TCFI}$ is the number of received encoded bits included in the comparison, $TFCI_{cw,i}(n)$ corresponds to an $n^{th}$ bit of the $i^{th}$ known encoded bit sequence of the known bit sequence set, and $TFCI_{rx}(n)$ corresponds to the $n^{th}$ bit of the received encoded bits of the encoded bit sequence indicating the transmission parameters of the frame.

* * * * *

UNITED STATES PATENT AND TRADEMARK OFFICE
CERTIFICATE OF CORRECTION

| | |
|---|---|
| PATENT NO. | : 7,702,036 B2 |
| APPLICATION NO. | : 11/204112 |
| DATED | : April 20, 2010 |
| INVENTOR(S) | : Kinnunen et al. |

It is certified that error appears in the above-identified patent and that said Letters Patent is hereby corrected as shown below:

Column 13,

Line 23, "code" should read --the code--.

Signed and Sealed this
Nineteenth Day of July, 2011

David J. Kappos
*Director of the United States Patent and Trademark Office*